United States Patent [19]

Hindagolla et al.

[11] Patent Number: 5,108,503
[45] Date of Patent: * Apr. 28, 1992

[54] SMEAR RESISTANT INKS FOR INK-JET PRINTERS

[75] Inventors: Suraj L. Hindagolla, Corvallis; John M. Skene, Lake Oswego; Charles L. Thierheimer, Jr., Corvallis, all of Oreg.

[73] Assignee: Hewlett-Packard Company, Palo Alto, Calif.

[*] Notice: The portion of the term of this patent subsequent to Jun. 25, 2008 has been disclaimed.

[21] Appl. No.: 686,074

[22] Filed: Apr. 16, 1991

[51] Int. Cl.⁵ .............................................. C09D 11/02
[52] U.S. Cl. ........................................ 106/22; 106/20
[58] Field of Search ..................... 106/20, 22

[56] References Cited

U.S. PATENT DOCUMENTS 5,026,425  6/1991  Hindagolla et al. ................ 106/22

Primary Examiner—William R. Dixon, Jr.
Assistant Examiner—Helene Klemanski

[57] ABSTRACT

Inks for ink-jet printing have improved water resistance and smear resistance when they contain from about 2.5 to 25%, preferably from about 7.5% to about 12.5%, by weight, 2-pyrrolidone, N-(2-hydroxyethyl)-2-pyrrolidone, or mixtures thereof.

20 Claims, No Drawings

SMEAR RESISTANT INKS FOR INK-JET PRINTERS

TECHNICAL FIELD

This invention relates to ink formulations for ink-jet printers, particularly thermal ink-jet printers.

BACKGROUND ART

Thermal ink-jet printers operate by employing a plurality of resistor elements to expel droplets of ink through an associated plurality of nozzles. In particular, each resistor element, which is typically a pad of resistive material measuring about 50 $\mu$m × 50 $\mu$m, is located in a chamber filled with ink supplied from an ink reservoir. A nozzle plate, comprising a plurality of nozzles, or openings, with each nozzle associated with a resistor element, defines part of the chamber. Upon energizing of a particular resistor element, a droplet of ink is expelled through the nozzle toward the print medium, whether paper, fabric, or the like. The firing of ink droplets is typically under the control of a microprocessor, the signals of which are conveyed by electrical traces to the resistor elements. By proper selection of the signals, alphanumeric and other characters are formed on the print medium.

The tight tolerances of the nozzles (typically 50 $\mu$m diameter) require that the ink not clog the nozzles. Further, repeated firings of the resistor elements, which must withstand about 10 million firings over the life of the ink cartridge, can result in fouling of the resistor element. Finally, the ink composition must be capable of interacting with the print medium, especially paper, to penetrate the paper without undue spreading, and the ink composition should be smear resistance and waterfast on the paper.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations.

Accordingly, investigations continue into developing ink formulations which have improved properties and which do not elevate one property at the expense of the others.

DISCLOSURE OF THE INVENTION

In accordance with the invention, the waterfastness and smear resistance of water-soluble inks in formulations used in thermal ink-jet printers are significantly improved by the addition thereto of about 2.5 to 25 weight % of 2-pyrrolidone, N-(2-hydroxyethyl)-2-pyrrolidone, or a mixture thereof. The word "pyrrolidone," when used alone hereinafter, refers to either compound and mixtures of the same. These inks provide prints of good quality, even on plain paper.

BEST MODES FOR CARRYING OUT THE INVENTION

The ink formulations of the present invention comprise, by weight, from about 2.5% to about 25% pyrrolidone (as defined above), from about 1% to about 10% dye, and the balance water. Additives such as a drying time improver, a pH buffer, a biocide, and/or surfactant may also be included. Preferred formulations comprise, by weight, from about 7.5% to about 12.5% pyrrolidone (as defined above), from about 1% to about 4% dye, and the balance water.

A drying time improver can be incorporated to shorten the period that the ink is moist after it is ejected on to the print medium. The improver is a volatile liquid, such as a lower alcohol, i.e., one containing from 1 to 4 carbon atoms. Particularly useful in the practice of the invention is 1-propanol. The ink formulation may include up to about 10% by weight of a drying time improver, preferably from about 2% to about 3%. Excessive amounts of improver can adversely affect the quality of the print by causing the ink to spray as it is ejected from the printer.

The present invention may employ anionic or cationic dyes of any color. Typical anionic dyes contain sulfonate or carboxylate groups. Typical cationic dyes have polymethine or arylcarbonium groups. Pyrrolidone provides these dyes with enhanced water and smear resistance with respect to a water or water and glycol vehicle, such as those frequently used in highlighting markers. Additionally, the resistance to handling is improved.

The inks of this invention have a pH range from about 4 to about 12, preferably from about 6 to about 9, and most preferably from about 7 to 7.5. Inks with the broad range of pH can be used with piezo-electric printers, but thermal ink-jet printers need the narrower range due to the materials in the printhead. A buffer may be used to maintain the pH level. Among the useful buffers are ammonium acetate, 2-(N-morpholino) ethanesulfonic acid (MOPSO), and 3-(N-morpholino)-2-hydroxypropane sulfonic acid; of these buffers, MOPSO is the most preferred.

The biocides useful in this invention may be any one or more of the biocides that are commonly used with inks for thermal jet printers, for example, PROXEL and NUOSEPT.

The surfactants, and amounts thereof, useful as additives to the ink of the invention are those commonly employed in ink-jet printing.

In addition, organic solvents may be added to the ink as viscosity modifiers, surface tension modifiers, or to reduce nozzle clogging. Examples of suitable solvents include any of the glycols commonly employed in ink-jet printing, such as ethylene glycol, diethylene glycol, triethylene glycol, propylene glycol, and the like. The amount of organic solvent added may range up to about 5% of the ink composition. Higher amounts tend to degrade the print quality of the ink, and hence are not used in the practice of the invention.

The inks of this invention have enhanced waterfastness; this is particularly so with inks that have marginal waterfastness without pyrrolidone. The waterfastness of a print sample is determined by measuring its initial L* coordinate. It is then placed in a beaker of water and washed for five minutes. After that time, it is dried and the L* coordinate is remeasured. The difference between the initial L* and final L* is ΔL. The smaller the ΔL, the better the waterfastness.

With suitable conductive additives, the formulations of this invention can be used for continuous ink-jet printers (piezo-electric). Any non-corrosive, low toxicity, water-soluble salt may be used at a concentration from about 0.01 wt % to about 0.1%. Lower alkyl ammonium chlorides are typical examples.

INDUSTRIAL APPLICABILITY

The ink formulations of the present invention can be used wherever aqueous inks are employed and there is need for a water resistant print. They are, however, specifically designed to operate in a thermal ink-jet device, such as the DeskJet ™ printer. DeskJet is a trademark of Hewlett-Packard Company.

EXAMPLES

Example 1

An ink was formulated consisting, by weight, of
2% DB 168 (Na salt),
10% 2-pyrrolidone,
0.1% MOPSO,
balance water.

This ink had a pH of 7 to 7.5. It also had excellent print quality, smear resistance, crusting, and kogation. This ink had a $\Delta L$ of 4.5, which is considerably lower than a $\Delta L$ of 20 measured for an ink in which the pyrrolidone was replaced by 20 wt % diethylene glycol.

Example 2

Two other inks were prepared. These corresponded to the ink of Example 1 except that one had 10% N-(2-hydroxyethyl)-2-pyrrolidone and the other had a mixture of 5% 2-pyrrolidone and 5% N-(2-hydroxyethyl)-2-pyrrolidone instead of 10% 2-pyrrolidone. The properties of these inks were substantially the same as the properties of the ink in Example 1 except that a print from the first had a $\Delta L$ of 11.1 and a print from the second had a $\Delta L$ of 7.3.

Example 3

Five inks were prepared, all having the same dye load and pH buffer as in Example 1, except that the organic solvent and its concentration differed, as set forth in Table I below.

TABLE I

| Ink Sample | Organic Solvent, wt % | PO[1] | PO[2] | PO[3] |
|---|---|---|---|---|
| A | 2-P, 10% | 4.5 | 4.5 | 4.5 |
| B | DEG, 10% | 4.5 | 4.5 | 4.5 |
| C | DEG + NMP, 10% + 10% | 2.0 | 1.5 | 2.0 |
| D | 10% NHEP | 5.0 | 4.5 | 5.0 |
| E | DEG + NMP, 30% + 10% | 0.5 | 0.5 | 0.5 |

Notes:
2-P = 2-pyrrolidone
DEG = diethylene glycol
NMP = N-methyl pyrrolidone
NHEP = N-hydroxyethyl pyrrolidone
[1]PQ rating for Champion Datacopy paper
[2]PQ rating for Ardor Bond
[3]PQ rating for Xerox 4024

Print quality was qualitatively measured against internal standards and averaged. The higher the number, the better the print quality. A value of 5 is the highest number possible on the scale used.

The above data indicates that NHEP is as good as or better than 2-pyrrolidone for print quality, and that these two organic solvents are superior to traditional ink-jet inks.

Example 4

To show that the waterfastness improvement is a general concept, rather than a specific case, three inks were prepared, all having 2 wt % Acid Black 191 as the dye. The results are tabulated in Table II, below.

TABLE II

| | Waterfastness and Dye Transfer of Acid Black 191. | |
|---|---|---|
| Ink | Waterfastness ($\Delta L$) | Dye Transfer (mOD) |
| 10% DEG | 22 | 645 |
| 10% DEG + 10% NMP | 12 | 500 |
| 10% 2-P | 15 | 550 |

These results indicate that 2-P is a better solvent than DEG for improving waterfastness. The same effect was used where the ink was Direct Black 168. Also, these results appear to show that the 10% DEG+10% NMP ink system to be better in waterfastness than the 10% 2-P ink system. However, such a comparison cannot be made on an equitable basis, since one ink has twice the concentration of organics than the other. As the total organic solvent concentration is increased, an increase in waterfastness is observed, but at a sacrifice in print quality.

The dye transfer test measures the amount of dye transferred from the printed area to the unprinted area when water is dripped across a print sample held at a 45° angle and subsequently dried. The lower the number, the lower the dye transfer and hence the better the ink.

Thus, there has been disclosed a smear resistant ink suitable for ink-jet printing. It will be readily apparent to those skilled in the art that various changes and modifications of an obvious nature may be made without departing from the spirit of the invention. All such changes and modifications are considered to fall within the scope of the invention, as defined by the appended claims.

What is claimed is:

1. An ink-jet ink suitable for ink-jet printing, comprising, by weight:
   (a) from about 2.5% to about 25% of a pyrrolidone selected from the group consisting of 2-pyrrolidone, N-(2-hydroxyethyl)-2-pyrrolidone, and mixtures thereof;
   (b) from about 1% to about 10% dye; and
   (c) the balance water,
said ink having a pH ranging from about 4 to about 12.

2. The ink of claim 1 which is buffered to a pH from about 6 to about 9.

3. The ink of claim 2 which is buffered to a pH from about 7 to about 7.5.

4. The ink of claim 2 which contains, as buffer, ammonium acetate, 2-(N-morpholino) ethanesulfonic acid, or 3-(N-morpholino)-2-hydroxypropanesulfonic acid.

5. The ink of claim 1 which contains a biocide.

6. The ink of claim 2 which contains a non-corrosive, low toxicity, water-soluble salt.

7. The ink of claim 6 wherein the non-corrosive salt is a lower alkyl ammonium chloride.

8. The ink of claim 2 wherein the pyrrolidone is present in a range from about 7.5% to about 12.5%.

9. The ink of claim 2 wherein the dye is present in a range from about 1% to about 4%.

10. The ink of claim 2 which contains from up to about 10% of a drying time improver.

11. The ink of claim 10 wherein the drying time improver is a lower alcohol having from 1 to about 4 carbon atoms.

12. The ink of claim 11 which contains from about 2% to about 3% of a drying time improver.

13. The ink of claim 12 which contains from about 2% to about 3% 1-propanol.

14. The ink of claim 1 further including up to about 5% of a glycol.

15. An ink-jet ink suitable for ink-jet printing, comprising, by weight:
   (a) from about 7.5% to about 12.5% of a pyrrolidone selected from the group consisting of 2-pyrrolidone, N-(2-hydroxyethyl)-2-pyrrolidone, and mixtures thereof;
   (b) from about 1% to about 4% dye;
   (c) sufficient ammonium acetate, 2-(N-morpholino) ethanesulfonic acid, or 3-(N-morpholino)-2-hydroxypropane to provide the ink with a pH from about 7 to about 7.5; and
   (d) the balance water.

16. The ink of claim 15 which contains from about 2% to about 3% drying time improver.

17. The ink of claim 16 wherein the drying time improver is 1-propanol.

18. The ink of claim 15 further including up to about 5% of a glycol.

19. An ink-jet ink suitable for ink-jet printing, consisting essentially of, by weight:
   (a) from about 7.5% to about 12.5% of a pyrrolidone selected from the group consisting of 2-pyrrolidone, N-(2-hydroxyethyl)-2-pyrrolidone, and mixtures thereof;
   (b) from about 1% to about 4% dye;
   (c) sufficient ammonium acetate, 2-(N-morpholino) ethanesulfonic acid, or 3-(N-morpholino)-2-hydroxypropane to provide the ink with a pH from about 7 to about 7.5;
   (d) from about 2% to about 3% drying time improver;
   (e) up to about 5% glycol; and
   (f) the balance water.

20. The ink of claim 19 wherein the drying time improver is 1-propanol.

* * * * *